United States Patent
Gonzales et al.

(10) Patent No.: US 7,307,360 B2
(45) Date of Patent: Dec. 11, 2007

(54) UNINTERRUPTIBLE POWER SUPPLIES

(75) Inventors: James Gonzales, Mesa, AZ (US); Govindasamy Tamizhmani, Gilbert, AZ (US); Bradley Rogers, Chandler, AZ (US); Liang-Jun Ji, Gilbert, AZ (US)

(73) Assignee: Arizona Board of Regents, Tempe, AZ (US)

( * ) Notice: Subject to any disclaimer, the term of this patent is extended or adjusted under 35 U.S.C. 154(b) by 207 days.

(21) Appl. No.: 11/047,988

(22) Filed: Jan. 31, 2005

(65) Prior Publication Data

US 2006/0006739 A1   Jan. 12, 2006

Related U.S. Application Data

(60) Provisional application No. 60/540,676, filed on Jan. 30, 2004.

(51) Int. Cl.
*H02J 7/00*   (2006.01)
*H01H 3/00*   (2006.01)
*H01H 3/28*   (2006.01)
*H01M 12/00*  (2006.01)

(52) U.S. Cl. .................. 307/64; 307/66; 307/139; 307/140; 429/9

(58) Field of Classification Search .......... 320/134; 429/9; 307/140, 64, 66, 139; 323/303
See application file for complete search history.

(56) References Cited

U.S. PATENT DOCUMENTS

| | | | |
|---|---|---|---|
| 5,307,002 A | * | 4/1994 | Ho et al. .................. 320/139 |
| 5,801,522 A | * | 9/1998 | McKenzie .................. 323/303 |
| 6,011,324 A | | 1/2000 | Kohlstruck et al. |
| 6,403,249 B1 | | 6/2002 | Reid |
| 6,459,175 B1 | * | 10/2002 | Potega .................. 307/149 |
| 6,504,270 B1 | * | 1/2003 | Matsushita .................. 307/140 |
| 6,602,627 B2 | | 8/2003 | Liu et al. |
| 6,902,837 B2 | * | 6/2005 | McCluskey et al. .......... 429/9 |
| 7,119,454 B1 | * | 10/2006 | Chiao .................. 307/9.1 |
| 2002/0021109 A1 | * | 2/2002 | Marvin et al. ............ 320/134 |
| 2003/0025397 A1 | * | 2/2003 | Young et al. .................. 307/64 |

(Continued)

OTHER PUBLICATIONS

Internet site; http://www.pcguide.com/ref/power/ext/ups/over-c.html; entitled Uninterruptible Power Supply Overview, Jun. 17, 2005, pp. 1-3.

Internet site, http://www.pcguide.com/ref/power/ext/ups/typesOnLine-c.html; entitled Online ("True") UPS, Jun. 17, 2005, pp. 1-3.

*Primary Examiner*—Michael Sherry
*Assistant Examiner*—Tien Mai
(74) *Attorney, Agent, or Firm*—Christie, Parker & Hale LLP

(57) ABSTRACT

Uninterruptible power supplies (UPSs) are generally discussed herein with particular discussions extended to fuel-cell-based UPSs used in conjunction with DC power supplies for improved operating efficiencies. With a wide voltage DC power supply, a DC-AC inverter may be omitted from the UPS and power from a back up power source, such as a battery or a fuel cell, may be applied directly to the DC power supply without performing two power conversions. The end result is a more efficient system capable of longer operating time.

17 Claims, 3 Drawing Sheets

U.S. PATENT DOCUMENTS

2003/0072977 A1* 4/2003 Speranza et al. ............... 429/9
2003/0080622 A1* 5/2003 Koenig ......................... 307/64
2003/0111908 A1* 6/2003 Christensen ................. 307/43
2004/0056633 A1* 3/2004 Sugiura et al. ............. 320/101
2004/0202900 A1* 10/2004 Pavio et al. ................... 429/9
2005/0052085 A1* 3/2005 Chang et al. ................. 307/66

* cited by examiner

UNINTERRUPTIBLE POWER SUPPLIES

CROSS-REFERENCE TO RELATED APPLICATION

This is an ordinary application of Ser. No. 60/540,676 filed Jan. 30, 2004, the contents of which are expressly incorporated herein by reference.

Uninterruptible power supplies (UPSs) are generally discussed herein with particular discussions extended to fuel-cell-based UPSs used in conjunction with DC power supplies for improved operating efficiencies.

BACKGROUND

Fuel cells are rapidly becoming a significant source of power in our society, and their use in a variety of applications is inevitable. One such application is the use of a fuel cell as a power source in an uninterruptible power supply (UPS) for use with an electronic device or digital equipment, such as a personal computer (PC).

One advantage of using a fuel cell instead of a battery as the power source in a UPS is the fuel cell's high energy density, and therefore, the ability to operate a system for very long periods of time while off the utility grid. However, a fuel cell based UPS is not without limitations. Although it can operate for very long periods of time, it is still limited by the amount of fuel (usually hydrogen) available.

Fuel cell based UPSs that have emerged typically operate in a parallel backup configuration to the utility grid and rely on status monitoring and control in combination with a transfer switch or the like to operate when the line power is interrupted. An exemplary prior art fuel cell based UPS is disclosed in U.S. Pat. No. 6,602,627 to Liu et al., the contents of which are expressly incorporated herein by referenced. Typical prior art fuel cell based UPSs generally require appropriate consideration for the hold time of the equipment to be powered and the transfer time of the UPS in switching over to fuel cell operation.

In a few fuel cell based UPSs that has emerged, a DC-AC inverter is typically incorporated for converting the fuel cell's DC power to AC power for use by the equipment to be powered. When use as power backup for a PC, for example, there may be a minimum of two power conversions that take place between the fuel cell and the computer's actual components. They include a DC-AC conversion in the UPS and an AC-DC conversion in the computer's power supply. These conversions waste a considerable amount of hydrogen in feeding the fuel cell and allowing the power produced by the fuel cell to dissipate as heat. Additionally, if the inverter in the power supply is incapable of accepting a wide input voltage range that a typical fuel cell provides, an additional DC-DC converter must be used to bring the input voltage to within the inverter's tolerance, which results in three inefficiencies.

Accordingly, there is a need for a fuel cell based true online UPS that has improved operating efficiency.

SUMMARY

The present invention may be implemented by providing an uninterruptible power supply (UPS) for powering an electronic device comprising a charging unit connected to a rechargeable battery comprising a battery output, a fuel cell stack comprising a fuel cell output connected in parallel with the rechargeable battery with a blocking diode located between the battery output and the fuel cell output, and wherein a DC-AC inverter is absence from the UPS.

The present invention may also be practiced by providing an uninterruptible power supply (UPS) for powering an electronic device comprising a charging unit connected to a rechargeable battery comprising a battery output, a fuel cell stack comprising a fuel cell output connected in parallel with the rechargeable battery with a blocking diode located between the battery output and the fuel cell output, a control circuit for switching from battery operation to fuel cell operation when power supplied to the charging unit is under normal voltage.

The present invention may yet be practiced by a method for using an uninterruptible power supply (UPS) with an electronic device comprising: connecting AC voltage to an input terminal of a UPS housing; connecting DC voltage output from the UPS housing to the electronic device; wherein the UPS comprises a charging unit connected to a rechargeable battery comprising a battery output, a fuel cell stack comprising a fuel cell output connected in parallel with the rechargeable battery with a blocking diode located between the battery output and the fuel cell output, a control circuit for switching from battery operation to fuel cell operation when AC voltage supplied to the input terminal is under normal voltage.

Other aspects and advantages of the present invention are described in the Detailed Description set forth below.

BRIEF DESCRIPTION OF THE DRAWINGS

These and other features and advantages of the present invention will become appreciated as the same becomes better understood with reference to the specification, claims and appended drawings wherein:

DETAILED DESCRIPTION

The detailed description set forth below in connection with the appended drawings is intended as a description of the presently preferred embodiments and methods for making fuel cell based UPSs provided in accordance with aspects of the present invention and is not intended to represent the only forms in which the present invention may be constructed or utilized. The description sets forth the features and the steps for constructing and using the fuel cell based UPSs of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like or similar elements or features.

Figure 1:
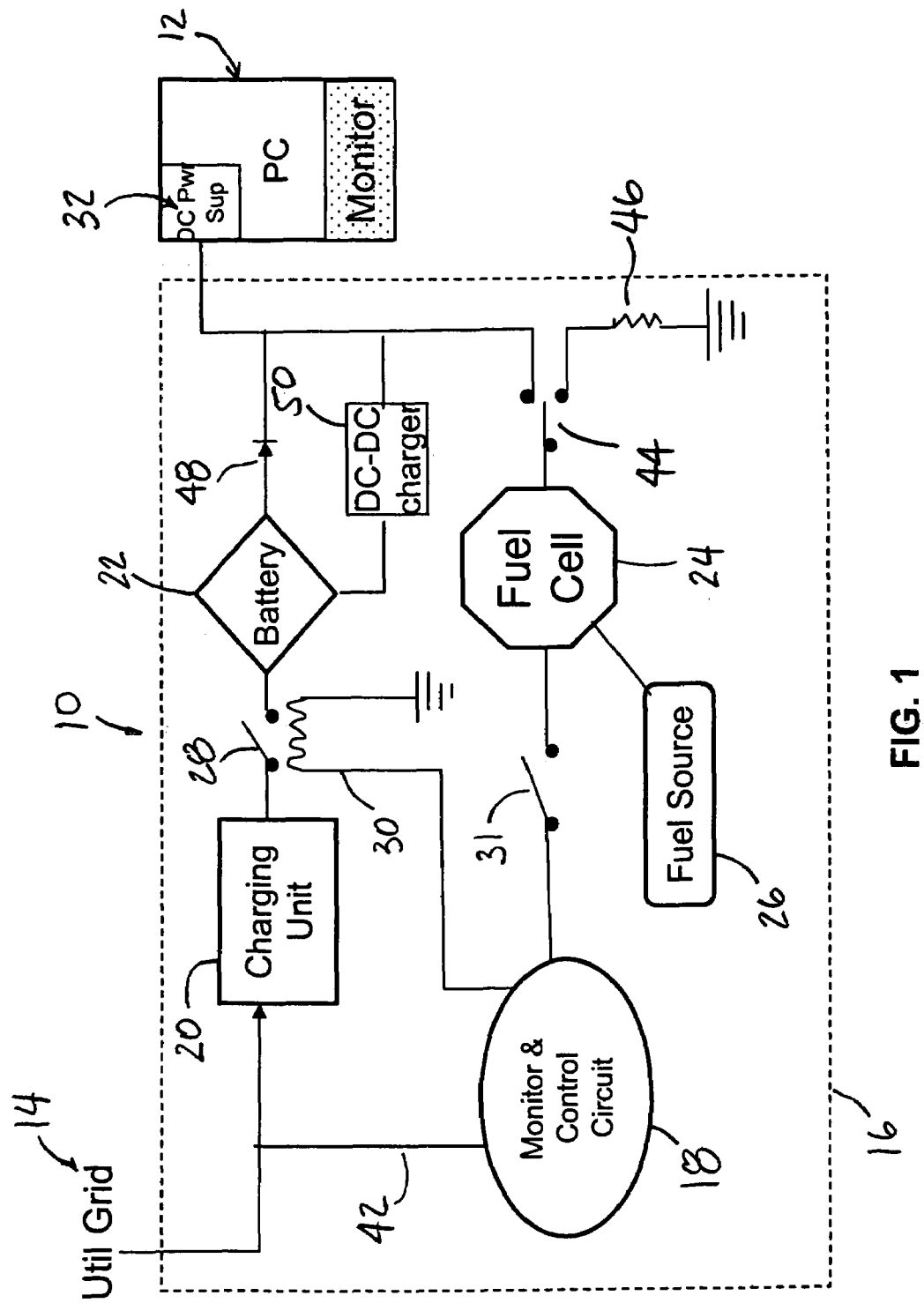
FIG. 1 is schematic diagram depicting a fuel cell based UPS provided in accordance with aspects of the present invention connected to a power grid and a personal computer.

Referring now to FIG. 1, an exemplary schematic diagram depicting a fuel cell based uninterruptible power supply (UPS) unit 10 connected to a personal computer (PC) 12 and to the utility power grid 14 is shown. In one exemplary embodiment, the UPS unit or UPS 10 comprises a housing 16 (represented by dot-dashed lines), which houses at least one of the following components: a system monitor and control circuit 18, a charging unit 20, at least one rechargeable battery 22, and a fuel cell stack 24. The fuel cell stack 24 can be any number of fuel cells including Polymer Electrolyte Membrane (PEM), Direct Methanol, Solid Oxide, Alkaline, Phosphoric Acid, Regenerative, and Molten Carbonate. Preferably, the fuel stack 24 is of the PEM type and receives its fuel from a fuel source 26, which is preferably mounted external of the housing 16 for maintenance and for refueling purposes. In an exemplary embodiment, the fuel source is a hydrogen tank. In an exemplary embodiment, the fuel cell stack 24 is part of a prior art fuel cell system comprising a cooling system, shut-off valve, pressure regulator, etc., connected to the battery 22 in parallel configuration.

Broadly speaking, the UPS 10 is an online type UPS or true UPS and when powered by the utility grid 14, operates like prior art online UPSs. When the UPS 10 is plugged into the utility grid, power from the grid travels to the charging unit 20 to charge the battery 22. In an exemplary embodiment, the charging unit comprises an AC-DC power supply providing a DC voltage suitable for the battery being charged. More preferably, the charging unit 20 comprises battery monitoring circuitry, and current or voltage is controlled by the circuitry to the battery for maintaining a safe charge rate for the battery. In one exemplary embodiment, the battery comprises a sealed lead acid gel type preferably capable of providing a voltage compatible with the fuel cell being used. For example, if the fuel cell has an output voltage range of 26V to 40V, a battery of 24V would work well, but 12V would be less preferred. Preferably, the fuel cell (based on the number of cells) should be designed to provide a suitable voltage output based on the battery's output. In an exemplary embodiment, the fuel cell output to the battery output should be between about 1.1 to 3 fuel cell output to about 1 battery output.

In an alternative embodiment, rather than incorporating a wide input voltage computer PSU, a single wide input DC-DC converter that would convert the fuel cell's wide output voltage to a single regulated voltage just slightly higher than the battery's fully charged voltage could be incorporated. While this alternative embodiment would be somewhat less efficient than a direct fuel cell-to-computer's PSU connection, it is simpler since a standard DC power supply may be used rather than a wide input voltage power supply unit.

During normal operation, the charging switch 28 is activated by, for example, a relay 30, and charges the battery 22. The battery then feeds the load, which in the present embodiment is a PC 12 comprising a monitor. During normal operation, the fuel cell switch 31 opens and the fuel cell is isolated from the load. In a preferred embodiment, the fuel cell stack is turned off during normal operation and no fuel is supplied to the fuel cell stack. Fuel cell operation in an existing fuel cell system is well known in the art.

Figure 2:
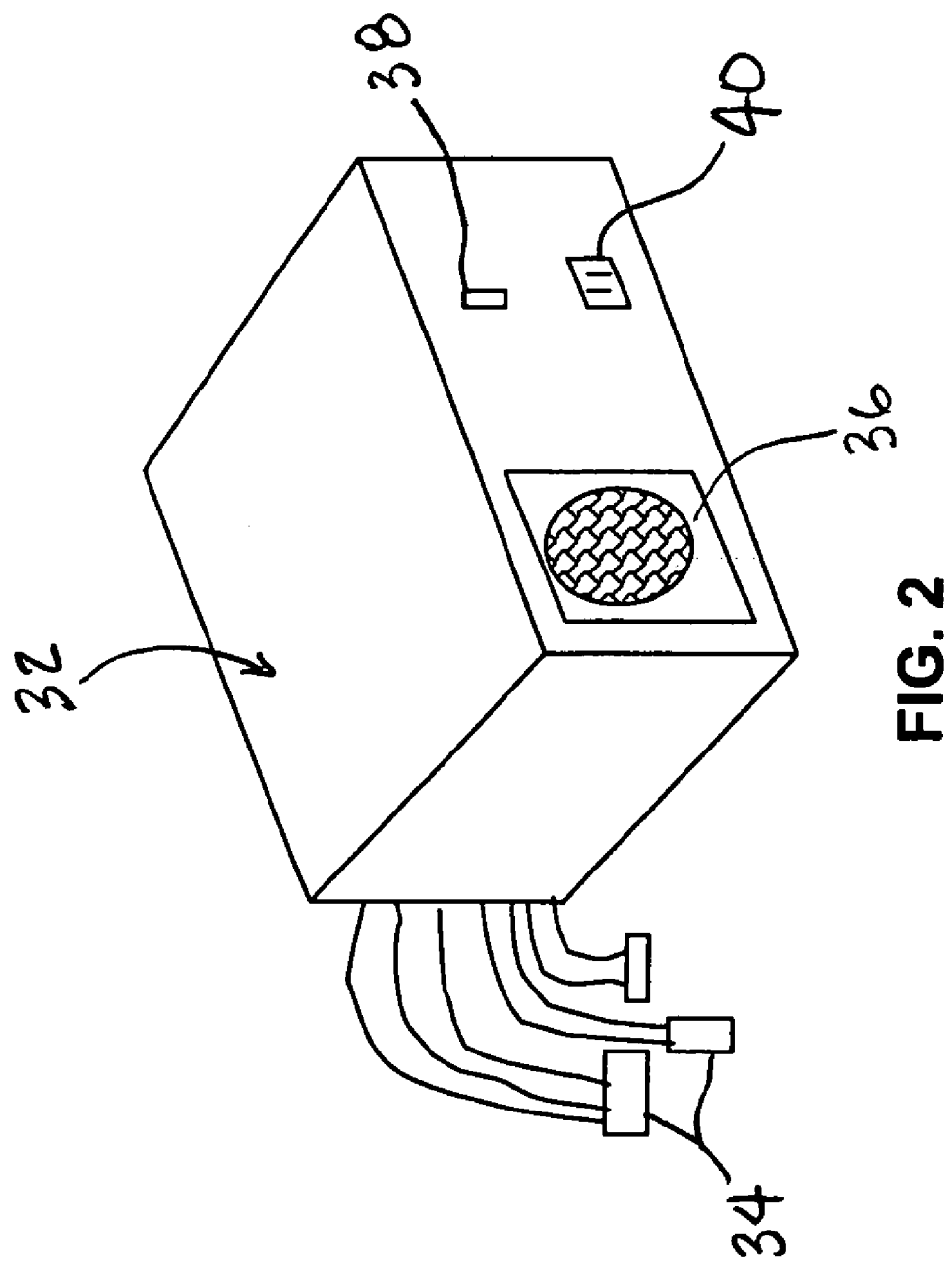
FIG. 2 is a semi-schematic diagram of a DC power supply provided in accordance with aspects of the present invention.
Figure 3:
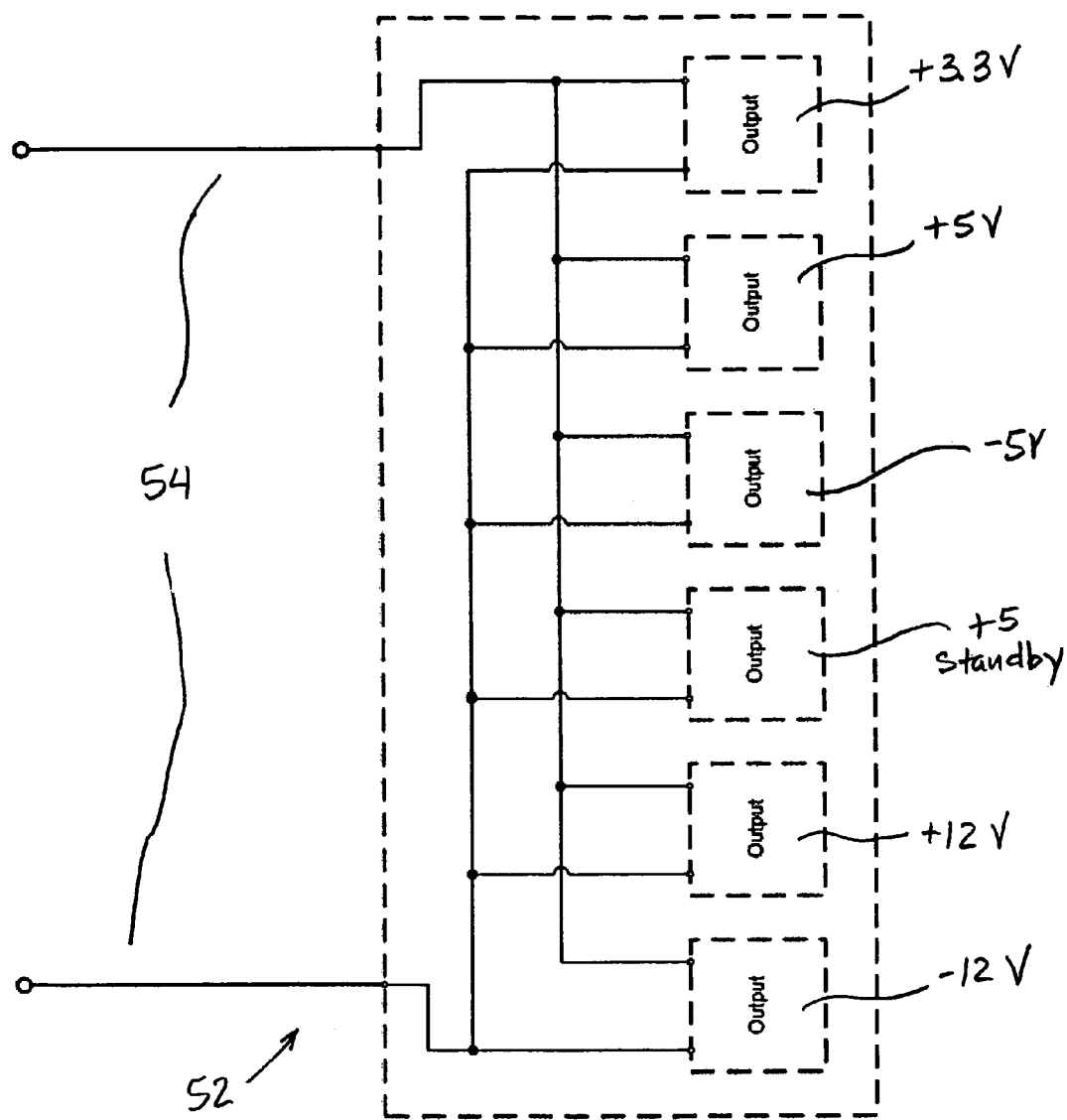
FIG. 3 is a semi-schematic diagram of a DC power supply power configuration.

Power supplied by the battery 22 to the PC 12 is by way of the power supply unit (PSU) 32. In an exemplary embodiment, the PSU 32 is a wide voltage DC power supply unit of an ATX form factor, FIG. 2. The PSU 32 is similar to prior art ATX form factor power supplies in that it provides different DC voltages to different computer components inside the PC 12, has printed circuit boards and electrical components for providing standby power and communications between the mother board and the PSU using a plurality of connectors 34, provides cooling through one or more fans 36, has an input voltage selector 38, and has a power plug receptacle 40. However, the PSU preferably does not incorporate a DC-AC inverter. Among other things, one would not be needed as power supplied to the PSU 32 from the UPS 10 is DC type voltage. FIG. 3 is a schematic diagram of an exemplary 4 to 1 DC power supply unit 52 provided in accordance with aspects of the present invention. In one exemplary embodiment, the DC power supply unit 52 comprises a DC input terminal 54 for receiving DC power from the fuel cell 24 or the battery 22. As an example, DC input can range from between about 18 VDC to about 75 VDC depending on whether the UPS is operating in battery mode or fuel cell mode. DC power from the input terminal 54 then feeds a circuit board (not shown) comprising circuitries for communicating and powering the PC 12 in a manner similar to an ATX form factor power supply unit. In one exemplary embodiment, the circuitries include one or more DC-DC converters for stepping up or stepping down the input voltage. For example, the one or more DC-DC converters may step down input voltage to produce +3.3 V, +5 V, –5 V, +5 V standby, +12 V, and –12 V output voltages. However, the input to output voltage ratio may vary depending on the needs of the electronic device to be powered by the UPS provided in accordance with aspects of the present invention. For example, rather a 4 to 1 input voltage range, the UPS may be configured for a range of about 2-4 input to 1 output voltage range.

Referring again to FIG. 1 and assuming that a power grid 14 failure, such as an under normal voltage condition, is experienced, the battery 22 will feed the PC 12 using its stored power. At the same time, the system monitor and control circuit 18 will sense a power drop in the input power line 42. In an exemplary embodiment, an appropriate time delay is incorporated before the control circuit 18 activates the fuel cell 24 subsequent to sensing the drop in power. During this time delay, the control circuit 18 verifies that the sensed power condition is not a momentary power dip. If a power failure is confirmed, the control circuit 18 closes the fuel cell switch 31 to turn on the fuel cell 24 to power the PC using power supplied by the fuel cell 24. In a preferred embodiment, the control circuit 18 will continue to recheck the line voltage periodically for normal line power and will switch back to battery mode when normal line power is detected.

In one exemplary embodiment, when the fuel cell 24 is activated, the battery 22 should be isolated as the voltage of the battery will dictate the voltage of the system and render the fuel cell inefficient when the battery and the fuel cell are connected in parallel configuration. Accordingly, a transfer switch may be incorporated between the output of the fuel cell 24 and the output of the battery 22. However, incorporating a transfer switch will present hold time and transfer time issues, which can be overcome with proper planning and component selections, but more complicated than necessary. Thus, in a preferred embodiment, a blocking diode 48 is incorporated. With the blocking diode 48, the fuel cell 24, which provides a higher voltage than the battery 22, will pick up the load automatically as soon as it is applied to the load. In an exemplary embodiment, a standard commercially available rectifier diode of sufficient voltage and current capability for the load is used.

An optional DC-DC charger 50 may be incorporated to charge the battery 22 using power from the fuel cell 24. If incorporated, the charger 50 is connected from between the fuel cell and the battery. The charge controller 50 should incorporate a blocking diode similar to the blocking diode 48 between the battery 22 and the fuel cell 24 to only allow current to flow to the battery, and not feed back to the fuel cell.

As is well known in the art, fuel cells can dehydrate and experience a drop in power as well as take a short time to come up to full power upon start up. Thus, in a preferred embodiment, a three-way switch, also known as a Single Pole Double Throw (SPDT) switch, 44 and a resistive load 46 of about 10-20 ohms resistant are incorporated. Before running the load on the fuel cell 24 or when the fuel cell 24 is dehydrated following a prolonged period of non-use operation, the three-way SPDT switch 44 is toggle to the resistive load 46 to rehydrate or to come up to full voltage power. In an alternative embodiment, a fuel cell hydration system may be used rather than running the fuel cell output to resistive load. Rehydration occurs automatically as water is produced by the reverse electrolysis process occurring in the fuel cell. In an exemplary embodiment, a timer may be incorporated for operating the fuel cell under a resistive load before switching the fuel cell over to power the PC. More preferably, a voltage sensor is incorporated in the monitor and control circuit 18 for sensing the fuel cell voltage output. If an appropriate voltage is detected by the control circuit 18, the three-way SPDT switch 44 will be switched over to power the PC.

In one exemplary embodiment, during fuel cell operation, the battery switch 28 is opened to isolate the charging unit 20 from the battery 22. This step is incorporated as input current to the charging unit can spike during under voltage conditions. Input current will increase due to a constant output power and a decrease in input voltage. Isolating the charging unit 20 will prevent it from overheating.

In a preferred embodiment, the control circuit 18 is powered by the grid power during normal operation. However, during power backup operation, the control circuit 18 may be powered by either the fuel cell 24 or the battery 22, which can be arranged to provide a redundant power source for the control circuit.

In an experiment conducted using a prior art fuel cell based UPS and a personal computer having a standard power supply unit, power consumed by the system was found to be:

3.09 A×33.7 V=104.1 W.

In a second experiment using a fuel cell based UPS provided in accordance with aspects of the present invention and a PC comprising a DC power supply, power consumed by the second system was found to be:

1.89 A×34.3 V=64.8 W.

The modified system had a power consumption reduction of:

(104.1−64.8)/104.1×100=37.8%.

The difference is attributable to the elimination of a DC-AC inverter in the UPS and a AC-DC inverter in the power supply. The operating time for the system using a standard fuel cell powered by UPS with a K/UK hydrogen cylinder was approximately 120 hours. Using the same cylinder at the improved efficiency would result in:

120 hours×1.606=192.7 hours.

Although limited preferred embodiments and methods for making fuel cell based UPSs and their components have been specifically described and illustrated herein, many modifications and variations will be apparent to those skilled in the art. For example, various switching and monitoring may be accomplished using different electronic or software scheme. Accordingly, it is to be understood that the fuel cell based UPSs constructed according to principles of this invention may be embodied other than as specifically described herein. The invention is also defined in the following claims.

What is claimed is:

1. An uninterruptible power supply (UPS) for supplying power to a personal computer, the UPS comprising:
    a charging unit connected to a rechargeable battery comprising a battery output,
    a control circuit for providing power from the battery output to the personal computer when receiving AC power from a utility grid;
    a fuel cell stack comprising a fuel cell output connected to a three-way switch and in parallel with the rechargeable battery with a blocking diode located between the battery output and the fuel cell output to block the battery output when the fuel cell output is greater than the battery output,
    wherein a DC-AC inverter is absent from the UPS,
    wherein the UPS is configured to output DC power and connect to the personal computer; and
    wherein the three-way switch is connected to the battery output and to a resistive load to rehydrate the fuel cell to bring the fuel cell to normal power output.

2. The UPS of claim 1, wherein the control circuit comprises a fuel cell switch for isolating the fuel cell output from the personal computer when receiving AC power from the utility grid.

3. The UPS of claim 1, wherein the fuel cell stack is part of a Polymer Electrolyte Membrane fuel cell system.

4. The UPS of claim 1, wherein DC power input comprises a wide voltage input DC power supply unit.

5. The UPS of claim 4, wherein the DC power supply unit has a wide voltage input range of 4 to 1.

6. The UPS of claim 4, wherein the personal computer comprises a DC power supply unit of a ATX form factor.

7. A method for supplying power to a personal computer from an uninterruptible power supply (UPS), the method comprising:
    connecting an input terminal of the UPS to an AC voltage source to provide AC power to the UPS during normal operation;
    connecting the personal computer to a DC voltage output of the UPS;
    wherein the UPS comprises:
        a charging unit connected to a rechargeable battery comprising a battery output,
        a fuel cell stack comprising a fuel cell output connected in parallel with the rechargeable battery with a blocking diode located between the battery output and the fuel cell output, and
    providing DC power to the personal computer from the battery output during normal AC power condition from the AC power source,
    switching the DC power from the battery output to the personal computer to the fuel cell output when not in the normal AC power condition; and
    directing the fuel cell output to a resistive load before using the fuel cell output to provide DC power to the personal computer.

8. The method of claim 7, further comprising isolating the battery output from a power feed header to the personal computer by the blocking diode after the fuel cell output exceeds the battery output.

9. The method of claim 7, wherein the personal computer comprises a wide voltage input DC power supply unit.

10. The method of claim 9, wherein the DC power supply unit has a wide voltage input range of 4 to 1.

11. An uninterruptible power supply (UPS) configured to power a personal computer, the UPS comprising:
   a charging unit connected to a rechargeable battery comprising a battery output,
   a fuel cell stack comprising a fuel cell output connected in parallel with the rechargeable battery,
   a blocking diode located between the battery output and the fuel cell output; the blocking diode blocking the fuel cell output from the battery output when the fuel cell output exceeds the battery output;
   a resistive load connected to the fuel cell output;
   a control circuit for causing the battery output to feed DC power to the personal computer when the UPS is operating under AC power and for causing the fuel cell output to heat the resistive load before blocking the fuel cell output, and
   wherein the UPS is configured to output DC power and connect to the personal computer without using a DC-AC inverter.

12. The UPS of claim 11, wherein the personal computer does not include an AC-DC converter.

13. The UPS of claim 11, further comprising a three-way switch connected to the fuel cell output and the resistive load.

14. The UPS of claim 11, wherein the three-way switch is connected to the battery output when the control circuit toggles the three-way switch off of the resistive load.

15. The UPS of claim 11, wherein the blocking diode is arranged to block current from the fuel cell output from entering the battery output.

16. The UPS of claim 11, wherein the personal computer comprises a wide voltage input DC power supply unit.

17. The UPS of claim 16, wherein the DC power supply unit has a wide voltage input range of about 3.2-4 to about 1.

* * * * *